(12) United States Patent
Sodagar (10) Patent No.: US 11,310,303 B2
(45) Date of Patent: Apr. 19, 2022

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/031,314

(22) Filed: Sep. 24, 2020

(65) Prior Publication Data

US 2021/0099509 A1 Apr. 1, 2021

Related U.S. Application Data

(60) Provisional application No. 62/908,964, filed on Oct. 1, 2019.

(51) Int. Cl.
| | |
|---|---|
| *G06F 15/16* | (2006.01) |
| *H04L 65/65* | (2022.01) |
| *H04N 21/84* | (2011.01) |
| *H04N 21/435* | (2011.01) |
| *H04L 67/02* | (2022.01) |

(52) U.S. Cl.
CPC ............ *H04L 65/608* (2013.01); *H04L 67/02* (2013.01); *H04N 21/435* (2013.01); *H04N 21/84* (2013.01)

(58) Field of Classification Search
CPC ..... H04L 65/608; H04L 67/02; H04N 21/435; H04N 21/84

USPC ........................................................ 709/219
See application file for complete search history.

(56) References Cited

U.S. PATENT DOCUMENTS

| | | | |
|---|---|---|---|
| 2014/0150019 A1* | 5/2014 | Ma .................. | H04L 65/602 725/34 |
| 2015/0312303 A1 | 10/2015 | Krishna et al. | |
| 2016/0134900 A1* | 5/2016 | Wei .................. | H04N 21/85406 725/32 |
| 2017/0048562 A1* | 2/2017 | Edson .............. | H04N 21/23109 |
| 2018/0196935 A1* | 7/2018 | Yamagishi ......... | H04N 21/6334 |
| 2019/0104316 A1 | 4/2019 | Da Silva Pratas Gabriel et al. | |
| 2020/0336803 A1* | 10/2020 | Fan .................. | H04N 21/6587 |

(Continued)

OTHER PUBLICATIONS

Information technology—Dynamic adaptive streaming over HTTP (DASH)—Part 1: Media presentation description and segment formats, N18609, Aug. 12, 2019 (287 pages).

(Continued)

*Primary Examiner* — Alan S Chou
(74) *Attorney, Agent, or Firm* — Arentfox Schiff LLP (57) ABSTRACT

Aspects of the disclosure provide methods, apparatuses, and non-transitory computer-readable storage mediums for receiving media data. One apparatus includes processing circuitry that receives a media presentation description (MPD) file that includes an MPD event indicating a plurality of branches of a story map. The processing circuitry receives a user selection of one of the plurality of branches of the story map during an active duration of the MPD event. The user selected branch corresponds to a next period that is connected to a current period. The processing circuitry receives, from a server, media data of the next period corresponding to the user selected branch.

17 Claims, 5 Drawing Sheets

(56) References Cited

U.S. PATENT DOCUMENTS

2021/0014558 A1* 1/2021 Fan ................... H04N 21/4402

OTHER PUBLICATIONS

Appendix A, DASH-MPD (21 pages).
Appendix B, DASH-MPD-UP (2 pages).
Appendix C, example_G1 (3 pages).
Appendix D, example_G2 (3 pages).
Appendix E, example_G3 (3 pages).
Appendix F, example_G4 (4 pages).
Appendix G, example_G5 (3 pages).
Appendix H, example_G6 (2 pages).
Appendix I, example_G7 (3 pages).
Appendix J, example_G8 (3 pages).
Appendix K, example_G9 (3 pages).
Appendix L, example_G10 (3 pages).
Appendix M, example_G11 (3 pages).
Appendix N, example_G11_remote.period (2 pages).
Appendix O, example_G12 (3 pages).
Appendix P, example_G13-1 (2 pages).
Appendix Q, example_G13-2 (2 pages).
Appendix R, example_G14 (2 pages).
Appendix S, example_G15 (3 pages).
Appendix T, example_G16 (3 pages).
Appendix U, example_G17 (3 pages).
Appendix V, example_G18 (3 pages).
Appendix W, example_H1 (2 pages).
Appendix X, example_H2 (3 pages).
Appendix Y, example_H3 (3 pages).
Appendix Z, example_I1 (2 pages).
Appendix AA, example_I2 (2 pages).
Appendix AB, example_I3 (2 pages).
Appendix AC, example_I4 (2 pages).
Appendix AD, License (2 pages).
Appendix AE, README.md (2 pages).
Appendix AF, Figure 4 (2 pages).
Appendix AG, Figure-1 (2 pages).
Appendix AH, Figure-2 (2 pages).
Appendix AI, Figure-3 (2 pages).
Appendix AJ, Figure-5 (2 pages).
Appendix AK, Figure-6 (2 pages).
Appendix AL, Figure-D.1 (2 pages).
Appendix AM, Figure-K.1 (2 pages).
International Search Report dated Jan. 8, 2021 in International Application No. PCT/US2020/053087, (9 pages).

* cited by examiner

METHODS AND APPARATUSES FOR DYNAMIC ADAPTIVE STREAMING OVER HTTP

INCORPORATION BY REFERENCE

This present application claims the benefit of priority to U.S. Provisional Application No. 62/908,964, "INTERACTIVE STORYLINE DASH STREAMING" filed on Oct. 1, 2019, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving Picture Expert Group (MPEG) dynamic adaptive streaming over hypertext transfer protocol (DASH) provides a standard for streaming multimedia content over IP networks. In MPEG DASH, a single manifest can represent a single storyline of a story map. It is possible to update the manifest to change the storyline. However, the story map needs to be maintained outside of the manifest by an application.

SUMMARY

Aspects of the disclosure provide apparatuses for receiving media data. One apparatus includes processing circuitry that receives a media presentation description (MPD) file that includes an MPD event indicating a plurality of branches of a story map. The processing circuitry receives a user selection of one of the plurality of branches of the story map during an active duration of the MPD event. The user selected branch corresponds to a next period that is connected to a current period. The processing circuitry receives, from a server, media data of the next period corresponding to the user selected branch.

In an embodiment, the MPD event includes a start time of the active duration.

In an embodiment, the processing circuitry sends, to the server, selection information that indicates the user selected branch.

In an embodiment, the selection information includes a period identification (ID) of the next period corresponding to the user selected branch.

In an embodiment, the processing circuitry sends the selection information to the content server based on uniform resource locator (URL) information included in the MPD event and the period ID.

In an embodiment, the MPD file is updated to include period information of the next period.

In an embodiment, the processing circuitry stores period information of a period for each of the plurality of branches indicated by the MPD event and generates a local MPD file based on the received MPD file and the user selected branch.

Aspects of the disclosure provide methods for receiving media data. In one method, a media presentation description (MPD) file that includes an MPD event indicating a plurality of branches of a story map is received. A user selection of one of the plurality of branches of the story map is received during an active duration of the MPD event. The user selected branch corresponds to a next period that is connected to a current period. Media data of the next period corresponding to the user selected branch is received from a server.

Aspects of the disclosure also provide non-transitory computer-readable mediums storing instructions which when executed by a computer for receiving media data cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period, the MPD attribute availableStartTime, and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Interactive Storyline DASH Streaming

The present disclosure includes embodiments directed to storyline events and presents methods for conveying an interactive storyline in DASH media streaming. A streaming service can provide a user with a plurality of story branches of a story. The user can make a choice of one of the plurality of story branches and provide the choice back to the streaming service, and the streaming service can continue with the chosen branch of the story.

In an interactive storyline, at certain moments of a presentation of the storyline, the user can make a choice among possible branch choices provided by a story map. Then the storyline changes according to the user-choice. An example of an interactive storyline use-case is Netflix's Black Mirror published in 2018.

In the DASH standard, a manifest can be updated. Therefore it is possible to create a manifest with a single period in which an application can provide a choice to the user. In an example, the choice can be provided at or close to the end of period. The choice can provide to the user a plurality of different story branches, each branch corresponding to a period. Then the user can select one of the plurality of story branches. Depending on the user selection, the manifest can be updated with a new period, which carries the content of the story corresponding to the user selection. Such a manifest can be referred to as a dynamic manifest. Since the content is on demand, all period elements are stored in a server, and the dynamic manifest can be created by adding these periods one after another according to the user selection. In this solution, however, the story map is not provided, and if the user decides to go back and makes another choice, the server has to navigate to the desired point and author another manifest. A client system that presents the story does not have any view of the story map of the story.

This disclosure presents embodiments to provide the story map along with the manifest. So when the user makes a selection, the client system can maintain the story map and navigate through different branches of the storyline.

Figure 1:
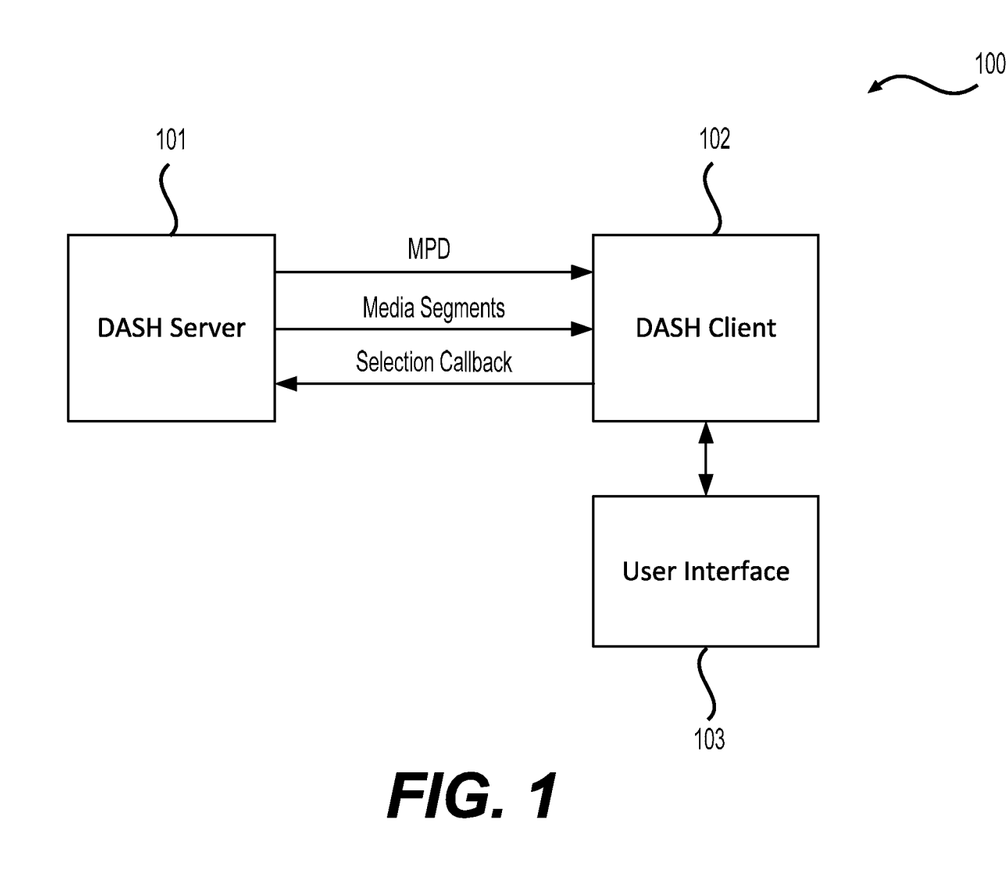
FIG. 1 shows an exemplary dynamic adaptive streaming over hypertext transfer protocol (DASH) system according to an embodiment of the disclosure.

FIG. 1 shows an exemplary DASH system (100) according to an embodiment of the disclosure. In the DASH system (100), an MPD file is sent from a DASH server (101) (e.g., a content server) to a DASH client (102). The DASH client (102) can receive media segments from the DASH server (101) based on the MPD file. The MPD file can provide a choice for a user to select a next interested period of the current period through a user interface (103). In an example, the selection of the next interested period can be sent back to the DASH server (101) by using a callback function. The DASH server (101) can update the MPD and send media content corresponding to the next interested period to the DASH client (102).

In an embodiment, the DASH server (101) provides an initial MPD and MPD updates as well as media segments to DASH client. The initial MPD, MPD updates, and/or media segments can be provided by different servers in other embodiments. Whenever the DASH client (102) receives a storyline event as part of MPD updates, the DASH client (102) can provide the storyline event to the user through the user interface (103). Then the user interface (103) informs the DASH client (102) of the user selection of an interested story branch, and the DASH client (102) can provide the user selection to the DASH server (101) so that the DASH server (101) can update the MPD accordingly.

Figure 2:
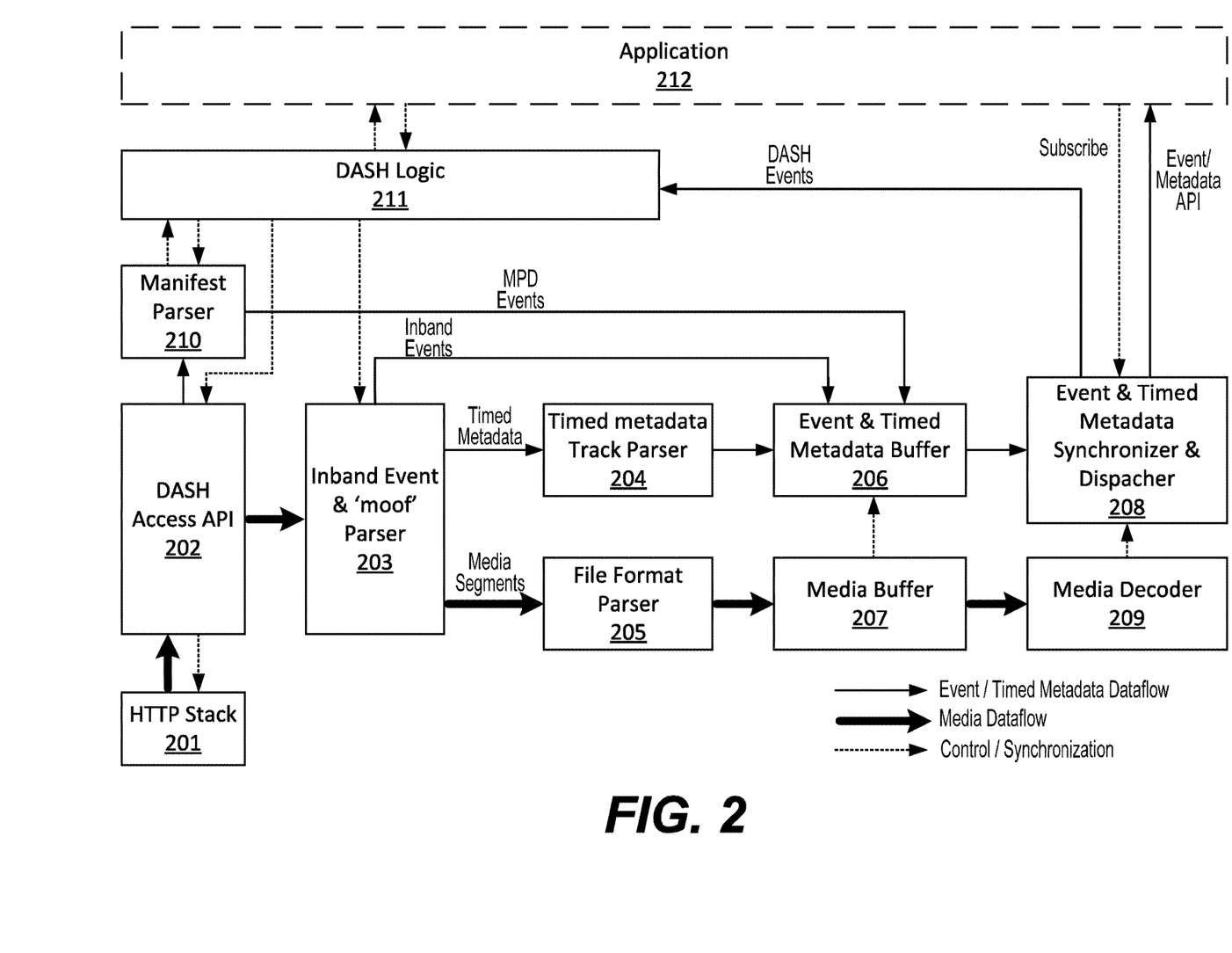
FIG. 2 shows an exemplary DASH client architecture according to an embodiment of the disclosure.

FIG. 2 shows an exemplary DASH client architecture according to an embodiment of the disclosure. The DASH client (or DASH player) can be configured to communicate with an application (212) and process various types of events, including (i) MPD events, (ii) inband events, and (iii) timed metadata events.

A manifest parser (210) can parse a manifest (e.g., an MPD). The manifest can be provided by the DASH server (101) for example. The manifest parser (210) can extract event information about MPD events, inband events, and timed metadata events embedded in timed metadata tracks. The extracted event information can be provided to a DASH logic (211) (e.g., DASH player control, selection, and heuristic logic). The DASH logic (211) can notify the application (212) of event schemes signaled in the manifest based on the event information.

The event information can include event scheme information for distinguishing between different event streams. The application (212) can use the event scheme information to subscribe to event schemes of interest. The application (212) can further indicate a desired dispatch mode for each of the subscribed schemes through one or more subscription application programming interfaces (APIs). For example, the application (212) can send a subscription request to the DASH client that identifies one or more event schemes of interest and any desired corresponding dispatch modes.

If the application (212) subscribes to one or more event schemes that are delivered as part of one or more timed metadata tracks, an inband event and 'moof' parser (203) can stream the one or more timed metadata tracks to a timed metadata track parser (204). For example, the inband event and 'moof' parser (203) parses a movie fragment box ("moof") and subsequently parses the timed metadata track based on control information from the DASH logic (211).

The timed metadata track parser (204) can extract event messages embedded in the timed metadata track. The extracted event messages can be stored in an event and timed metadata buffer (206). A synchronizer/dispatcher module (208) (e.g., event and timed metadata synchronizer and dispatcher) can dispatch (or send) the subscribed events to the application (212).

MPD events described in the MPD can be parsed by the manifest parser (210) and stored in the event and timed metadata buffer (206). For example, the manifest parser (210) parses each event stream element of the MPD, and parses each event described in each event stream element. For each event signaled in the MPD, event information such as presentation time and event duration can be stored in the event and timed metadata buffer (206) in association with the event.

The inband event and 'moof' parser (203) can parse media segments to extract inband event messages. Any such identified inband events and associated presentation times and durations can be stored in the event and timed metadata buffer (206).

Accordingly, the event and timed metadata buffer (206) can store therein MPD events, inband events, and/or timed metadata events. The event and timed metadata buffer (206) can be a First-In-First-Out (FIFO) buffer, for example. The event and timed metadata buffer (206) can be managed in correspondence with a media buffer (207). For example, as long as a media segment exists in the media buffer (207), any events or timed metadata corresponding to that media segment can be stored in the event and timed metadata buffer (206).

A DASH Access API (202) can manage the fetching and reception of a content stream (or dataflow) including media content and various metadata through an HTTP protocol stack (201). The DASH Access API (202) can separate the received content stream into different dataflows. The dataflow provided to the inband event and 'moof' parser (203) can include media segments, one or more timed metadata tracks, and inband event signaling included in the media segments. In an embodiment, the dataflow provided to the manifest parser (210) can include an MPD.

The DASH Access API (202) can forward the manifest to the manifest parser (210). Beyond describing events, the manifest can also provide information on media segments to the DASH logic (211), which can communicate with the application (212) and the inband event and 'moof' parser (203). The application (212) can be associated with the media content processed by the DASH client. Control/synchronization signals exchanged among the application (212), the DASH logic (211), the manifest parser (210), and the DASH Access API (202) can control the fetching of media segments from the HTTP Stack (201) based on information regarding media segments provided in the manifest.

The inband event and 'moof' parser (203) can parse a media dataflow into media segments including media content, timed metadata in a timed metadata track, and any signaled inband events in the media segments. The media segments including media content can be parsed by a file format parser (205) and stored in the media buffer (207).

The events stored in the event and timed metadata buffer (206) can allow the synchronizer/dispatcher (208) to communicate to the application (212) the available events (or events of interest) related to the application (212) through an event/metadata API. The application (212) can be configured to process the available events (e.g., MPD events, inband events, or timed metadata events) and subscribe to particular events or timed metadata by notifying the synchronizer/dispatcher (208). Any events stored in the event and timed metadata buffer (206) that are not related to the application (212), but are instead related to the DASH client itself can be forwarded by the synchronizer/dispatcher (208) to the DASH logic (211) for further processing.

In response to the application (212) subscribing to particular events, the synchronizer/dispatcher (208) can communicate to the application (212) event instances (or timed metadata samples) corresponding to event schemes to which the application (212) has subscribed. The event instances can be communicated in accordance with a dispatch mode indicated by the subscription request (e.g., for a specific event scheme) or a default dispatch mode. For example, in an on-receive dispatch mode, event instances may be sent to the application (212) upon receipt in the event and timed metadata buffer (206). On the other hand, in an on-start dispatch mode, event instances may be sent to the application (212) at their associated presentation time, for example in synchronization with timing signals from the media decoder (209).

It is noted that, in the DASH client architecture, the thick dataflow lines indicate media dataflow, the narrow dataflow lines indicate even and timed metadata dataflow, and the dash dataflow lines indicates control and synchronization. In addition, the same processing model can be used for CMAF events.

Figure 3:
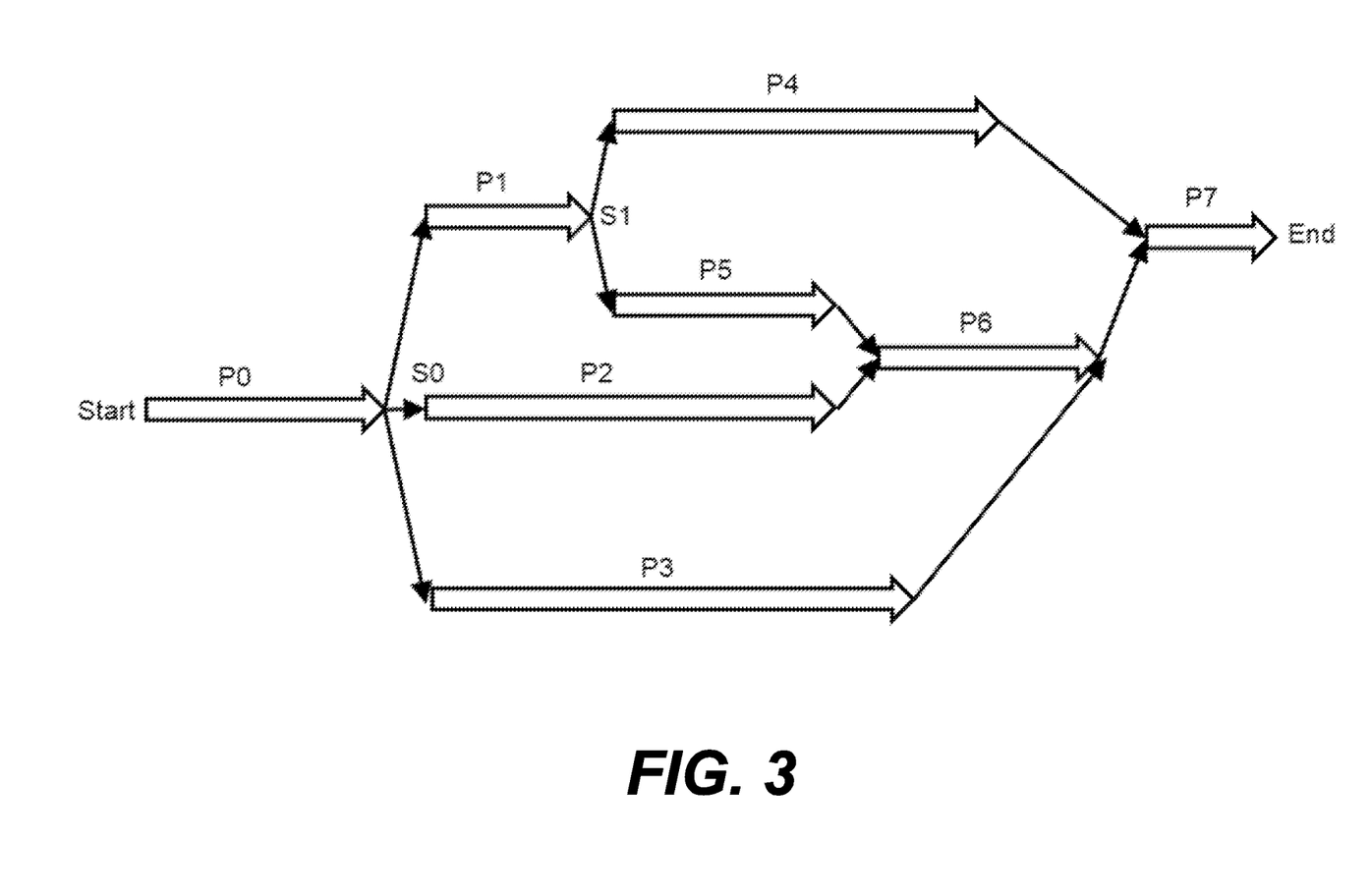
FIG. 3 shows an exemplary story map according to an embodiment of the disclosure.

FIG. 3 shows an exemplary story map of a story according to an embodiment of the disclosure. In the story map, the story starts with period P0. At the end of the period P0, the story map provides a selection point S0, indicating that the story has three branches P1, P2, and P3. At the end of period P1, the story map provides a selection point S1, indicating that the story has two branches P4 and P5. The rest of the story P6 and P7 occurs at a merging of various branches.

It is noted that a number of choices at each selection point can be set to 2 or more. A duration of each branch is not necessarily equal to each other. Some or all of the branches can merge at certain moments, and the merged branches can have different durations. In addition, the story can have one or more endpoints.

According to aspects of the disclosure, an MPD storyline event can be an MPD event indicating one or more selection points in the story map. An event scheme of the MPD event can be identified with a schemeIdUri such as "urn:mpeg:dash:manifest-storyline-event:2020". In an MPD file, only one EventStream element is allowed per period, and thus the events that are carried in the only one EventStream element should use the same URI in their scheme attributes (e.g., @schemeIdUri). In addition, the sub-scheme attributes (e.g., @value) of these events in the EventStream can be ignored by the DASH client (102). That is, no sub-schemes are defined for the events in the EventStream.

An exemplary MPD event element is shown in Table 1. In Table 1, start time information such as the attribute @presentationTime indicates a start time of the MPD event and duration information such as the attribute @duration indicates a duration of the MPD event. From the start time and during the duration, the user can make a selection. In addition, the MPD event element includes URL information such as an attribute @callbackUrl, which provides a URL for the client system (102) to make a request (e.g., HTTP GET request). The client system (102) can add a query to the URL based on the user selection. For example, the query can be "nextPeriod=id", in which id is a period identification (ID) (e.g., @id) value selected by the user through the user interface (103). The MPD event element includes replacement information such as an attribute @replace. If the attribute @replace is set 'true', then the MPD event is an update of all previous events in this session and a connection map (or story map) replaces previous connection maps. The MPD event includes a connection element specifying the connection map. The connection element can include a set of simple links in the connection map. For example, one link can be a connection from P0 to P1 in the story map shown in FIG. 3, and another link can be a connection from P0 to P2 or a connection from P0 to P3.

TABLE 1

| Element or Attribute Name | Use | Description |
| --- | --- | --- |
| Event | | specifies an Event and contains the message of the event. The content of this element depends on the event scheme. The contents shall be either: A string, optionally encoded as specified by @contentEncoding XML content using elements external to the MPD namespace For new event schemes string content should be used, making use of Base 64 encoding if needed. Note: The schema allows "mixed" content within this element however only string data or XML elements are permitted by the above options, not a combination. |
| @presentationTime | OD default: 0 | specifies the presentation time of the event relative to the start of the Period taking into account the @presentationTimeOffset of the Event Stream, if present. The value of the presentation time in seconds is the division of the value of this attribute and the value of the @timescale attribute. If not present, the value of the presentation time is 0. This value defines the start time of active duration when the user can make a selection. |
| @duration | O | specifies the presentation duration of the Event. The value of the duration in seconds is the division of the value of this attribute and the value of the @timescale attribute. The interpretation of the value of this attribute is defined by the scheme owner. If not present, the value of the duration is unknown. This value defines the duration in which the user can make a selection for this event. |
| @id | O | specifies an identifier for this instance of the event. Events with equivalent content and attribute values in the Event element shall have the same value for this attribute. The scope of the @id for each Event is with the same @schemeIdURI and @value pair. |
| @contentEncoding | O | specifies whether the information in the body and the information in the @messageData is encoded. If present, the following value is possible: base64 the content is encoded as described in IETF RFC 4648 prior to adding it to the field. If this attribute is present, the DASH Client is expected to decode the message data and only provide the decoded message to the application. This attribute is not used in the storyline event. |

TABLE 1-continued

| Element or Attribute Name | Use | Description |
| --- | --- | --- |
| @messageData | O | specifies the value for the event stream element. The value space and semantics must be defined by the owners of the scheme identified in the @schemeIdUri attribute. NOTE: the use of the message data is discouraged by content authors, it is only maintained for the purpose of backward-compatibility. Including the message in the Event element is recommended in preference to using this attribute. This attribute is expected to be deprecated in the future editions of this document. This attribute is not used in the storyline event. |
| @callbackUrl | O | Specifies the URL for DASH client to make an HTTP GET request with query "nextPeriod = id", in which id is the selected @id value by user interface. The default is MPD@Location. |
| @replace | O | If 'true', then this event is an update of all previous events in this session and the connection map replaces the previous connection maps. |
| Connection | 1 . . . N | Specifies the connection map |

Key
For attributes: M = Mandatory, O = Optional, OD = Optional with Default Value, CM = Conditionally Mandatory
For elements: <minOccurs> . . . <maxOccurs> (N = unbounded)
Elements are bold; attributes are non-bold and preceded with an @.

Table 2 shows an exemplary connection element. In the exemplary connection element, one or more links from a first period to one or more second periods can be indicated. For example, a link can be indicated by an attribute @from and an attribute @to. The attribute @from indicates a period from which the link starts. The attribute @to indicates one or more periods to which the link can be connected. Values of the attributes @from and @to can be period IDs. It is noted that the attribute @to can include one or more period IDs, each corresponding to a different link. In addition, a default value of the attribute @from can be a period ID of a parent period of the event. For example, the connection element of the storyline event at period P0 in the exemplary story map shown in FIG. 3 can be represented by <Connection to ="1 2 3"> or <Connection from ="0" to ="1 2 3">. In this example, it is assumed that P0@id="0", P1@id="1", P2@id="2", and P3@id="3".

TABLE 2

| Element or Attribute Name | Use | Description |
| --- | --- | --- |
| Connection | | specifies a Playlist by which specific durations of media timeline is replaced by MPDs defined in this element. |
| @from | O | Specifies the connected-from Period's @id value. The default is the parent Period's @id value of this event |
| @to | M | A whitespace-separated list of connected-to Period's @ids values If the user does not provide any selection in the duration of the event, the first listed Period is selected. |

Key
For attributes: M = Mandatory, O = Optional, OD = Optional with Default Value, CM = Conditionally Mandatory
For elements: <minOccurs> . . . <maxOccurs> (N = unbounded)
Elements are bold; attributes are non-bold and preceded with an @.

According to aspects of the disclosure, one or more connection elements can be included in one storyline event. Multiple connection elements can provide a part of or an entire connection map of a current session. However, it is noted that only the part of the connection map at or close to the end of the current period element is active for selection during the duration of the event. For example, the entire story map as shown in FIG. 3 can be represented in Table 3. In this example, it is assumed Pi@id="i". When the current period is P1, only the connection element <Connection from ="1" to ="4 5"> is active during the duration of the event. So the user can select P4 or P5 as a next period.

TABLE 3

| Connection from = "0" to = "1 2 3"> |
| --- |
| Connection from = "1" to = "4 5"> |
| Connection from = "2" to = "6"> |
| Connection from = "3" to = "7"> |
| Connection from = "4" to = "7"> |
| Connection from = "5" to = "6"> |
| Connection from = "6" to = "7"> |

According to aspects of the disclosure, the manifest (e.g., MPD) can be updated based on the user selection. The user selection can be provided to the DASH server (101) by using an out of band method or a callback function. The out of band method can be a method that is not based on the DASH standard. The callback function can allow the DASH client (102) to issue an HTTP GET request to a given URL. For example, after the user makes a selection, the DASH client (102) can make an HTTP GET request to the URL address indicated by the callback attribute (e.g., @callbackUrl) in the MPD event element. The selected period ID can be included in the query parameter of the request. Table 4 shows an exemplary callback function.

TABLE 4

| | |
|---|---|
| Valid HTTP/HTTPS URL | An HTTP GET request is expected to be issued to a URL contained in message_data[ ]. The URL shall be a NULL-terminated string. HTTP response shall either not be provided or be provided such that it can be discarded. |

In this disclosure, choices can be provided using MPD events which are simple to parse and pass to the application/user interface. In addition, the upcoming choices, the partial story map, or the entire story map can also be provided, and the story map can be updated. If the story map is delivered to the DASH client (102) a selection point by another selection point, the DASH client (102) can only have one selection at a time and not have the entire story map. The story map can be updated at each event (e.g., by including the past and future connections). An event can provide a start time and a duration (e.g., event active period) in which the user is allowed to make the selection. If the user does not make the selection, the presentation may continue with a default branch storyline. Since the event active duration can be set ahead of a transition to a next period, the client system (102) can have time to buffer the content of the next period for continuous playback. It is noted that the client system (102) can store the story map as well as period information of all periods and be able to build an interactive local MPD for playback.

The disclosure presents methods for delivering interactive storyline streaming content. A plurality of choices can be provided to the user at certain moments in the timeline of the story. The user can make a choice among the provided choices to change the story direction. An MPD event can be used to convey the plurality of choices for each period. The MPD event can be activated before the actual transition from the current period to the next period. The MPD event can have a duration for the client system (102) to buffer the selected next period and playback the content with no interruption or re-buffering. One or more selection points in the story map can be provided per MPD event, or the entire story map can be provided in any MPD event. Part of or the entire story map can be updated with each or some MPD events. The MPD event can also provide the URL for the client system (102) to send back the user choice. The MPD can be updated at the end of each period by adding the next period selected by the user. The DASH client (102) can build the story map gradually, or in one step if the story map is fully provided. The DASH client (102) can also store the corresponding periods, and therefore be able to build the entire interactive storyline and manufacture the MPD updates locally with no need to contact the DASH server (101) for MPD. The DASH server (101) can only stream the media content while the DASH client (102) plays the interactive story.

III. Flowchart

Figure 4:
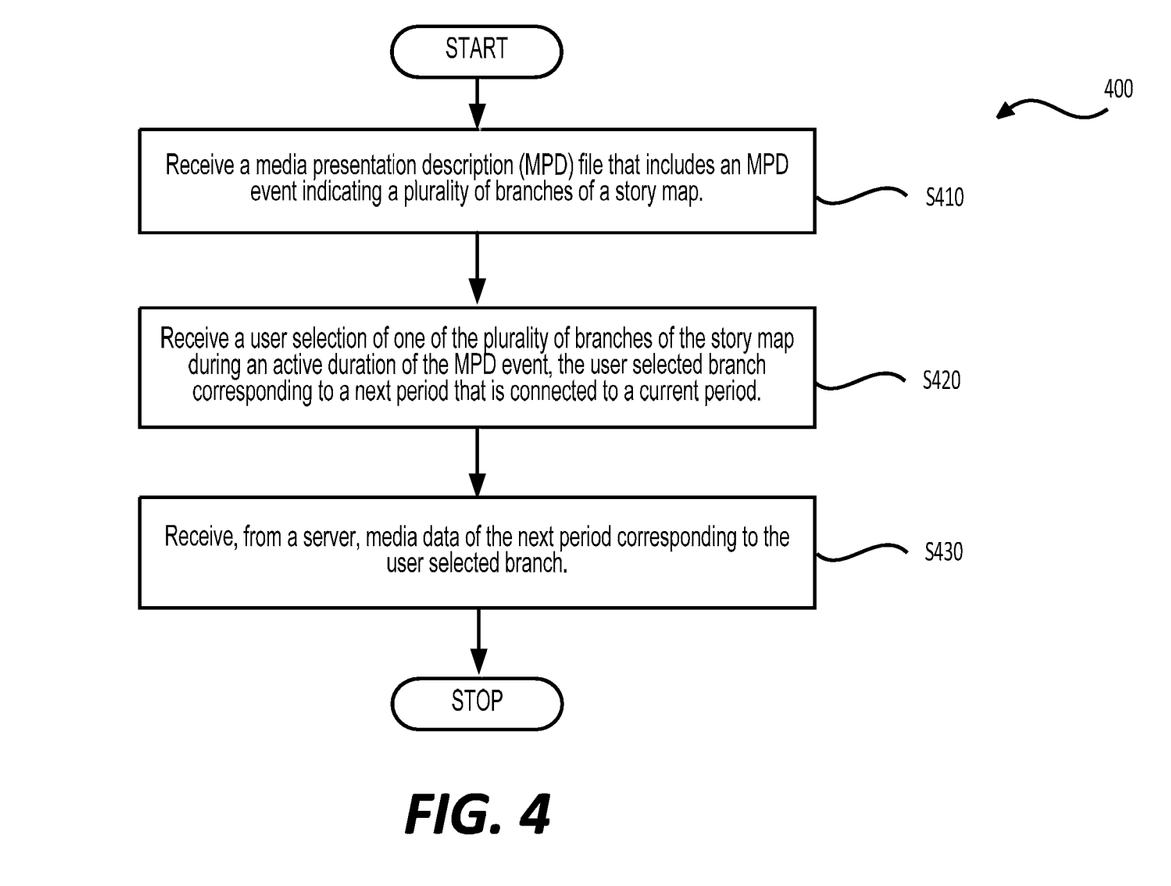
FIG. 4 shows a flow chart outlining a process example according to some embodiments of the disclosure.

FIG. 4 shows a flow chart outlining a process (400) according to some embodiments of the disclosure. In various embodiments, the process (400) is executed by processing circuitry, such as the processing circuitry in the DASH client (102). In some embodiments, the process (400) is implemented in software instructions, thus when the processing circuitry executes the software instructions, the processing circuitry performs the process (400). The process (400) starts at (S410), where the process (400) receives an MPD file that includes an MPD event indicating a plurality of branches of a story map. Then, the process (400) proceeds to step (S420).

At step (S420), the process (400) receives, from processing circuitry of an information processing apparatus, a user selection of one of the plurality of branches of the story map during an active duration of the MPD event. The user selected branch corresponds to a next period that is connected to a current period. Then, the process (400) proceeds to step (S430).

At step (S430), the process (400) receives, from a server, media data of the next period corresponding to the user selected branch. Then, the process (400) terminates.

In an embodiment, the MPD event includes a start time of the active duration.

In an embodiment, the process (400) sends, to the server, selection information that indicates the user selected branch.

In an embodiment, the selection information includes a period ID of the next period corresponding to the user selected branch.

In an embodiment, the process (400) sends the selection information to the content server based on URL information included in the MPD event and the period ID.

In an embodiment, the MPD file is updated to include period information of the next period.

In an embodiment, the process (400) stores period information of a period for each of the plurality of branches indicated by the MPD event and generates a local MPD file based on the received MPD file and the user selected branch.

IV. Computer System

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
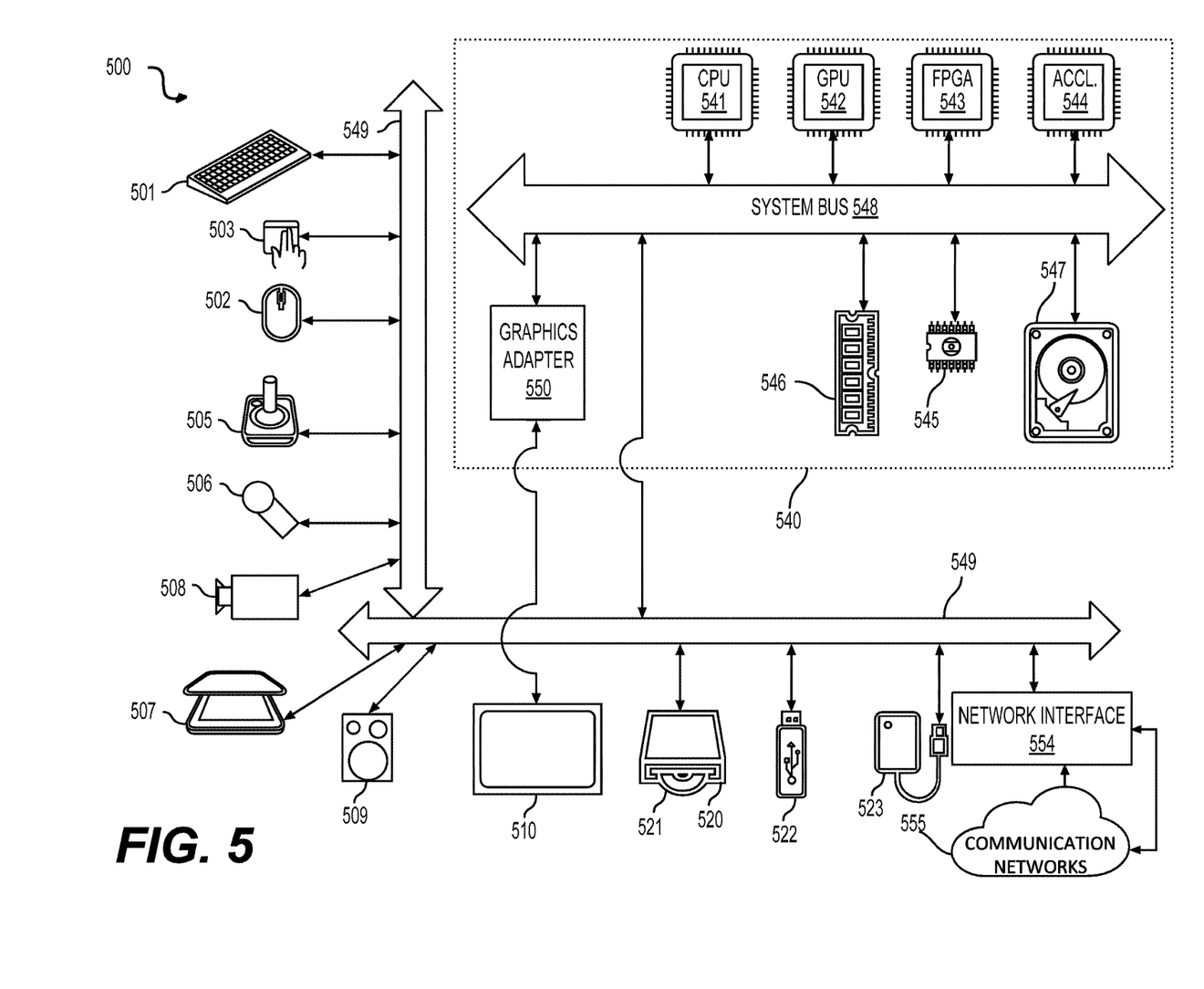
FIG. 5 is a schematic illustration of a computer system according to an embodiment of the disclosure.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), and camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (510)) can be connected to a system bus (548) through a graphics adapter (550).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include a network interface (554) to one or more communication networks (555). The one or more communication networks (555) can for example be wireless, wireline, optical. The one or more communication networks (555) can further be local, wide-area, metropolitan, vehicular and industrial, real-time, delay-tolerant, and so on. Examples of the one or more communication networks (555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), and so forth. These devices, along with Read-only memory (ROM) (545), Random-access memory (546), internal mass storage such as internal non-user accessible hard drives, SSDs, and the like (547), may be connected through the system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can be also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500) and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for receiving media data, the method comprising:
receiving a media presentation description (MPD) file that includes an MPD event indicating a plurality of alternative branches of a story map;
presenting, through a user interface, the plurality of alternative branches of the story map to a user by triggering the MPD event during reproduction of a current period;
receiving, through the user interface, a user selection of one of the plurality of alternative branches of the story map during an active duration of the MPD event, the user selected branch corresponding to a next period that is connected to the current period;
sending, to a server, a media segment request for the next period corresponding to the user selected branch; and
receiving, from the server, media data of the next period corresponding to the user selected branch.

2. The method of claim 1, wherein the current period includes the active duration of the MPD event.

3. The method of claim 1, wherein the media segment request includes a period identification (ID) of the next period corresponding to the user selected branch.

4. The method of claim 3, wherein the sending further comprises:
sending the media segment request to the server based on uniform resource locator (URL) information included in the MPD event and the period ID.

5. The method of claim 1, wherein the MPD file is updated to include period information of the next period.

6. The method of claim 1, further comprising:
storing period information of a period for each of the plurality of branches indicated by the MPD event; and
generating a local MPD file based on the received MPD file and the user selected branch.

7. An apparatus for receiving media data, the apparatus comprising:
processing circuitry configured to:
receive a media presentation description (MPD) file that includes an MPD event indicating a plurality of alternative branches of a story map;
present, through a user interface, the plurality of alternative branches of the story map to a user by triggering the MPD event during reproduction of a current period;
receive, through the user interface, a user selection of one of the plurality of alternative branches of the story map during an active duration of the MPD event, the user selected branch corresponding to a next period that is connected to the current period;
send, to a server, a media segment request for the next period corresponding to the user selected branch; and
receive, from the server, media data of the next period corresponding to the user selected branch.

8. The apparatus of claim 7, wherein the current period includes the active duration of the MPD event.

9. The apparatus of claim 7, wherein the media segment request includes a period identification (ID) of the next period corresponding to the user selected branch.

10. The apparatus of claim 9, wherein the processing circuitry is further configured to:
send the media segment request to the server based on uniform resource locator (URL) information included in the MPD event and the period ID.

11. The apparatus of claim 7, wherein the MPD file is updated to include period information of the next period.

12. The apparatus of claim 7, wherein the processing circuitry is further configured to:
store period information of a period for each of the plurality of branches indicated by the MPD event; and
generate a local MPD file based on the received MPD file and the user selected branch.

13. A non-transitory computer-readable storage medium storing instructions which when executed by a computer for receiving media data cause the computer to perform:
receiving a media presentation description (MPD) file that includes an MPD event indicating a plurality of alternative branches of a story map;
presenting, through a user interface, the plurality of alternative branches of the story map to a user by triggering the MPD event during reproduction of a current period;
receiving, through the user interface, a user selection of one of the plurality of alternative branches of the story map during an active duration of the MPD event, the user selected branch corresponding to a next period that is connected to the current period;
sending, to a server, a media segment request for the next period corresponding to the user selected branch; and
receiving, from the server, media data of the next period corresponding to the user selected branch.

14. The non-transitory computer-readable storage medium of claim 13, wherein the current period includes the active duration of the MPD.

15. The non-transitory computer-readable storage medium of claim 13, wherein the media segment request includes a period identification (ID) of the next period corresponding to the user selected branch.

16. The non-transitory computer-readable storage medium of claim 15, wherein the stored instructions cause the computer to further perform:
sending the media segment request to the server based on uniform resource locator (URL) information included in the MPD event and the period ID.

17. The non-transitory computer-readable storage medium of claim 13, wherein the MPD file is updated to include period information of the next period.

* * * * *